US010630580B2

(12) United States Patent
Ashwood-Smith

(10) Patent No.: US 10,630,580 B2
(45) Date of Patent: *Apr. 21, 2020

(54) SYSTEM AND METHOD FOR SOURCE ROUTING WITH ONE OR MORE DELAY SEGMENTS

(71) Applicant: Huawei Technologies Co., Ltd., Shenzhen (CN)

(72) Inventor: Peter Ashwood-Smith, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

This patent is subject to a terminal disclaimer.

(21) Appl. No.: 15/632,078

(22) Filed: Jun. 23, 2017

(65) Prior Publication Data

US 2017/0295106 A1 Oct. 12, 2017

Related U.S. Application Data

(62) Division of application No. 14/587,939, filed on Dec. 31, 2014, now Pat. No. 9,712,434.

(60) Provisional application No. 61/922,636, filed on Dec. 31, 2013.

(51) Int. Cl.
*G01R 31/08* (2020.01)
*H04L 12/723* (2013.01)
*H04L 12/823* (2013.01)
*H04L 12/841* (2013.01)
*H04L 12/70* (2013.01)

(52) U.S. Cl.
CPC ............ *H04L 45/50* (2013.01); *H04L 47/283* (2013.01); *H04L 47/32* (2013.01); *H04L 2012/5646* (2013.01)

(58) Field of Classification Search
USPC ............ 370/238, 392, 352, 389, 390, 395.5, 370/395.32, 396, 401, 428, 465, 466, 474, 370/475
See application file for complete search history.

(56) References Cited

U.S. PATENT DOCUMENTS

| 4,771,424 | A | 9/1988 | Suzuki et al. |
| 5,777,988 | A * | 7/1998 | Cisneros ............... H04J 3/0632 370/238 |
| 6,788,683 | B1 | 9/2004 | Ikeda et al. |
| 9,712,434 | B2 * | 7/2017 | Ashwood-Smith ..... H04L 47/32 |

(Continued)

*Primary Examiner* — Phuongchau Ba Nguyen
(74) *Attorney, Agent, or Firm* — Slater Matsil, LLP

(57) ABSTRACT

A plurality of network nodes, under the control of a network controller, are configured to perform a method to direct packets in a packet flow from a source to a destination. In one embodiment, the network controller transmits an instruction to a first node in a network instructing the first node to transmit a first packet in the packet flow along a first route from the source to the destination, the first route having a first delay. The network controller also transmits an instruction to a node in the network to transmit a second packet in the packet flow along a second route different from the first route, the second route having a second delay, the second delay having a duration less than a duration of the first delay. The network controller further transmits an instruction to a node in the second route to delay the second packet in order to delay arrival of the second packet at the destination.

20 Claims, 12 Drawing Sheets

(56) References Cited

U.S. PATENT DOCUMENTS

| | | | |
|---|---|---|---|
| 2001/0012295 A1* | 8/2001 | Wilford | H04L 45/00 370/392 |
| 2004/0146056 A1 | 7/2004 | Martin | |
| 2004/0184449 A1 | 9/2004 | Sreejith et al. | |
| 2004/0213228 A1* | 10/2004 | Tingle | H04L 12/462 370/389 |
| 2009/0147731 A1 | 6/2009 | Chion et al. | |
| 2013/0114598 A1* | 5/2013 | Schrum | H04L 45/22 370/392 |

* cited by examiner

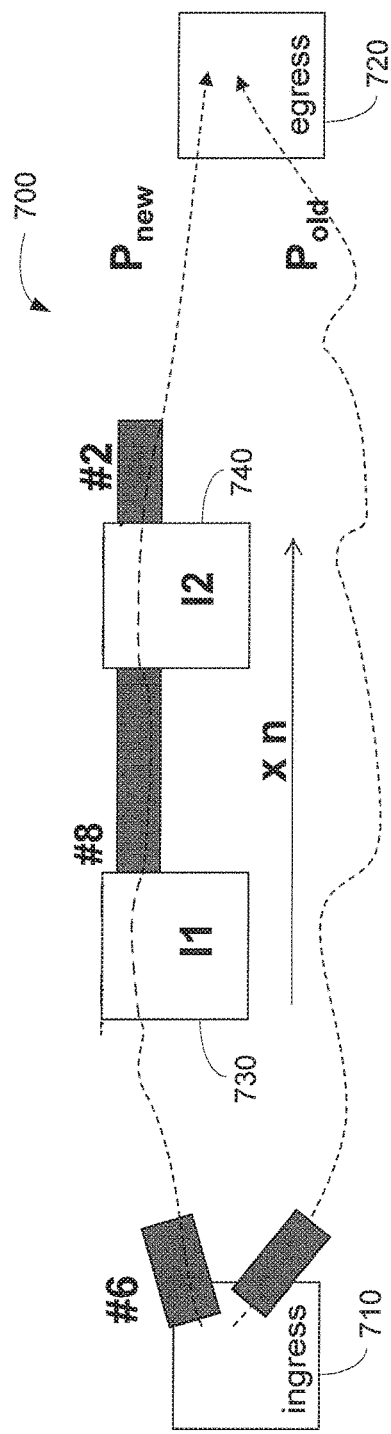
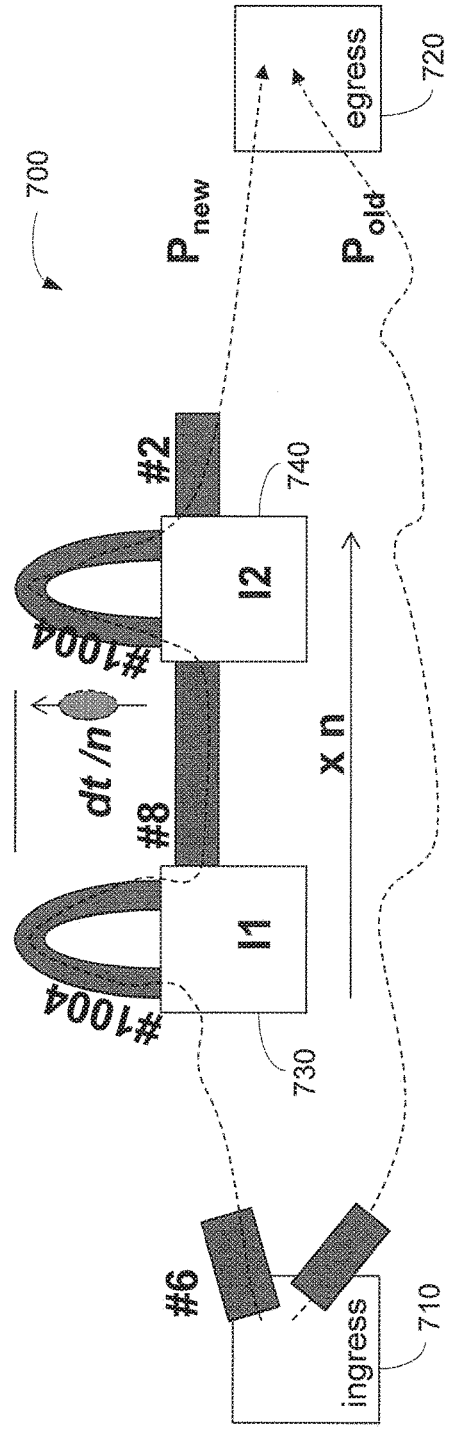
FIG. 7A
FIG. 7B

SYSTEM AND METHOD FOR SOURCE ROUTING WITH ONE OR MORE DELAY SEGMENTS

This application is a divisional of U.S. Non-Provisional application Ser. No. 14/587,939, filed on Dec. 31, 2014 and entitled "System and Method for Source Routing With One or More Delay Segments," which claims the benefit of U.S. Provisional Patent Application No. 61/922,636, filed on Dec. 31, 2013 and entitled "System and Method for Source Routing Hitless Reroute and a System and Method for Source Routing With Delay Segments", all of which applications are hereby incorporated herein by reference as if reproduced in their entirety.

TECHNICAL FIELD

The present disclosure relates generally to source routing, and more particularly, to a system and method for source routing with one or more delay segments.

BACKGROUND

Source routing is a mechanism to forward a packet through a network or network segment with no per path state provided at tandem devices (i.e., the devices or nodes within the network that are neither the ingress node nor the egress node of the source routed segment). In many systems, source routing is enabled by information contained in a source route header. A source route header typically contains an explicit list of links to follow, or a strict or loose list of nodes to follow in various encoding formats. Often the path that a packet should follow must be changed for administrative or operational reasons.

SUMMARY

This disclosure is directed to a system and method for source routing with one or more delay segments.

According to one embodiment, there is provided a method for a network controller to direct packets in a packet flow from a source to a destination. The method includes transmitting an instruction to a first node in a network instructing the first node to transmit a first packet in the packet flow along a first route from the source to the destination, the first route having a first delay; transmitting an instruction to a node in the network to transmit a second packet in the packet flow along a second route different from the first route, the second route having a second delay, the second delay having a duration less than a duration of the first delay; and transmitting an instruction to a node in the second route to delay the second packet in order to delay arrival of the second packet at the destination.

According to another embodiment, there is provided a method for a network node to direct packets in a packet flow from a source to a destination. The method includes, in accordance with an instruction from a network controller, buffering a packet in a packet flow for a delay duration, prior to transmitting the packet along a second route from a source to a destination, the delay duration determined in accordance with a difference in a delay associated with the second route and a delay associated with a first route between the source and the destination.

According to yet another embodiment, there is provided a network controller configured to direct packets in a packet flow from a source to a destination. The network controller includes at least one memory and at least one processor coupled to the at least one memory. The at least one processor is configured to control the network controller to transmit an instruction to a first node in a network instructing the first node to transmit a first packet in the packet flow along a first route from the source to the destination, the first route having a first delay; control the network controller to transmit an instruction to a node in the network to transmit a second packet in the packet flow along a second route different from the first route, the second route having a second delay, the second delay having a duration less than a duration of the first delay; and control the network controller to transmit an instruction to a node in the second route to delay the second packet in order to delay arrival of the second packet at the destination.

According to still another embodiment, there is provided a network node configured to direct packets in a packet flow from a source to a destination. The network node includes at least one memory and at least one processor coupled to the at least one memory. The at least one processor is configured to control the network node to, in accordance with an instruction from a network controller, buffer a packet in a packet flow for a delay duration, prior to transmitting the packet along a second route from a source to a destination, the delay duration determined in accordance with a difference in a delay associated with the second route and a delay associated with a first route between the source and the destination.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 7A and 7B illustrate example methods for using logical variable delay segments to achieve an additional delay in a source routing path, according to this disclosure;

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Source routing is characterized by a network with no per path state on tandem devices. Source routing can be used in different network architectures, including Internet Protocol (IP) networks, Multiprotocol Label Switching (MPLS) networks, Asynchronous Transfer Mode (ATM) networks, Software-Defined Networking (SDN) networks, and any other suitable network architectures. Often the path that a packet should follow is changed for administrative or operational reasons. For example, in the context of global optimization, the flow may be moved to a new path in order to optimize the network performance. In other cases, the flow may be moved for maintenance reasons (e.g., because a network card or other hardware component in the first path may need to be replaced). A mechanism to move a source routed stream of packets from one path to another with minimal or no impact on the end service is therefore required. In some cases, moving a packet transmission path from a path with a comparatively higher delay to a path with a comparatively lower delay can cause packet loss or mis-ordering.

Various existing techniques attempt to address these or similar issues, but such techniques are not associated with source routing; instead, they are either based on TDM/WDM (time division multiplexing/wavelength division multiplexing), or based on label substitution forwarding, like ATM or MPLS.

Accordingly, to address these issues, embodiments described in this disclosure provide a method to introduce delay in source routing to create the necessary delay to avoid mis-ordering. Some embodiments introduce delay in-band for tandem hops using the source route itself with delay segments to control tandem delay. These are described in greater detail below.

Figure 1:
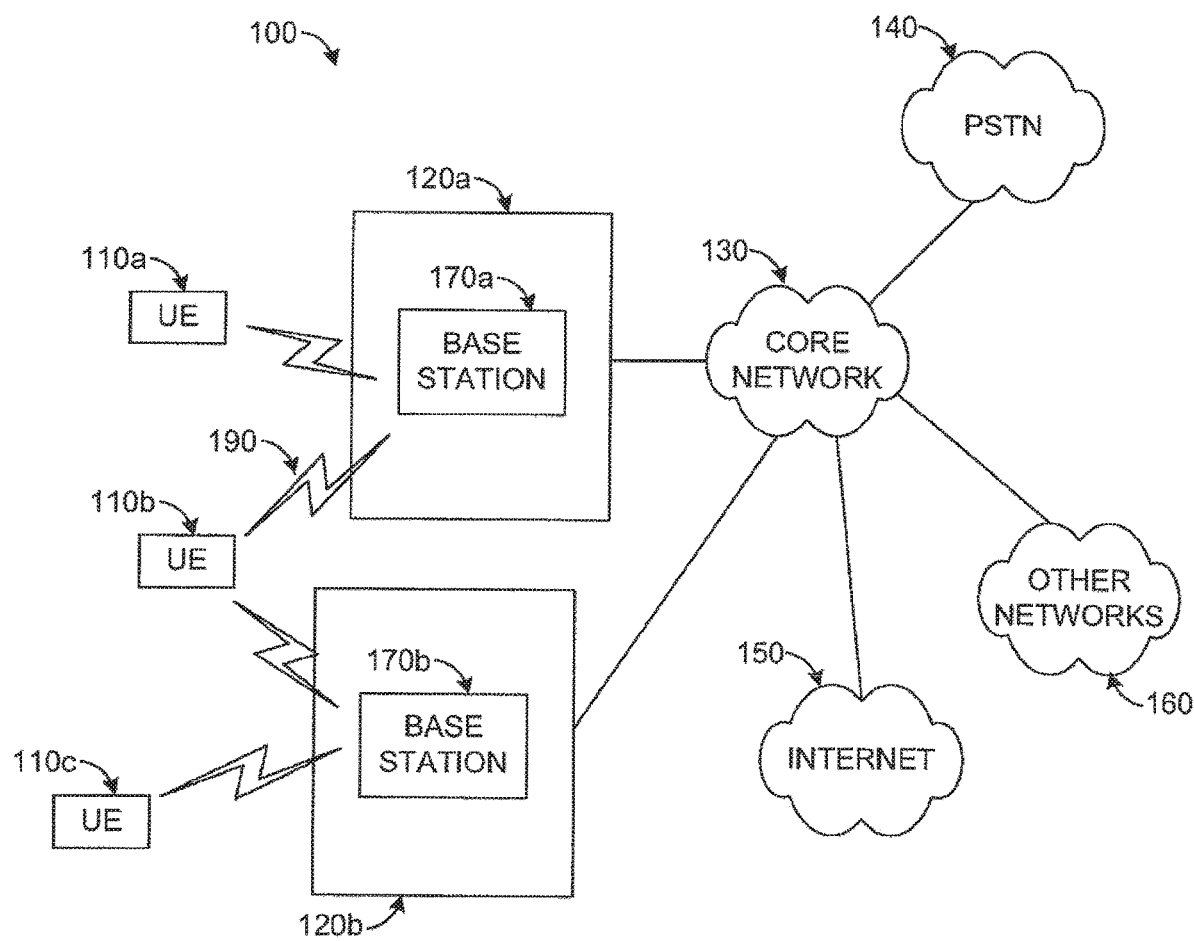
FIG. 1 illustrates an example communication system for source routing according to this disclosure.

FIG. 1 illustrates an example communication system 100 that is configured to use source routing according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless links such as communication links 190.

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100. In some embodiments, only wireline networking links are used.

The UEs 110a-110c are configured to operate and/or communicate in the system 100. For example, the UEs 110a-110c are configured to transmit and/or receive wireless signals or wired signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration, and can further include the EPC illustrated in any of the figures herein.

Figure 2A:
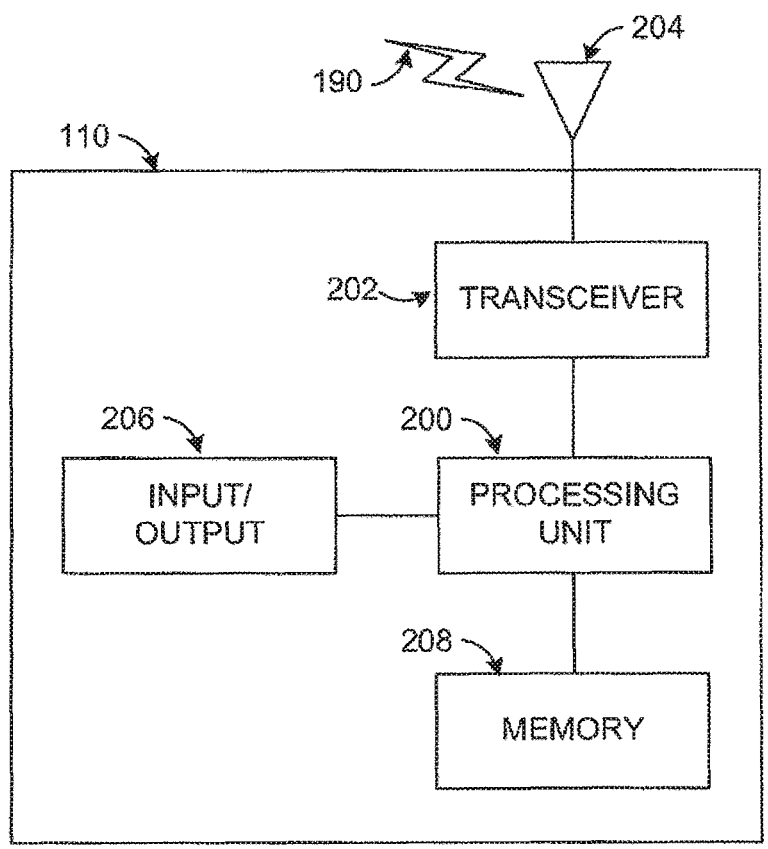
FIGS. 2A through 2C illustrate example devices that may implement the methods and teachings according to this disclosure.
Figure 2B:
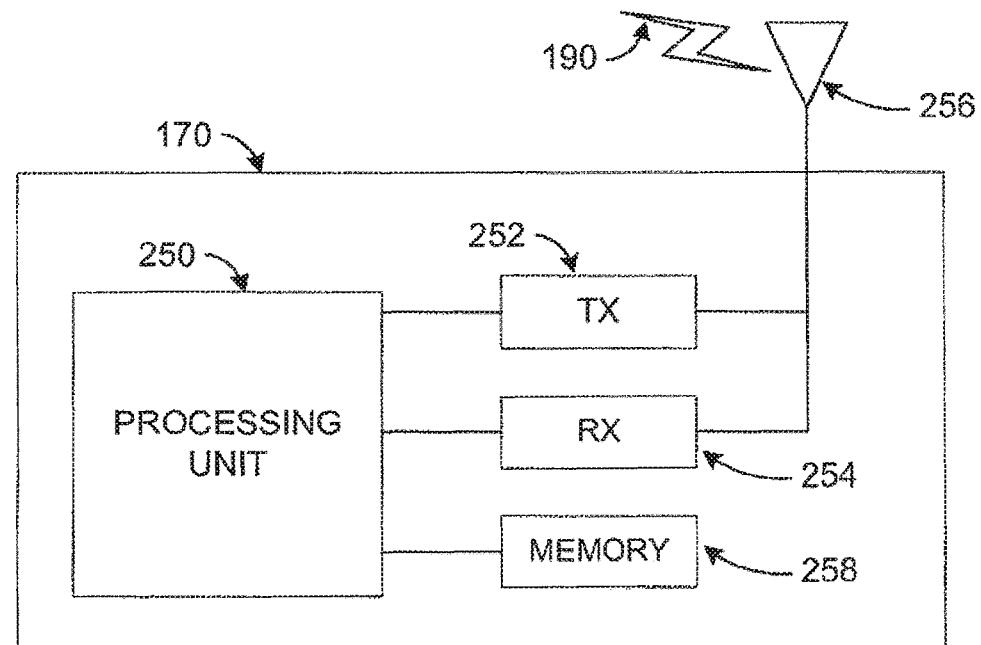
Figure 2C:
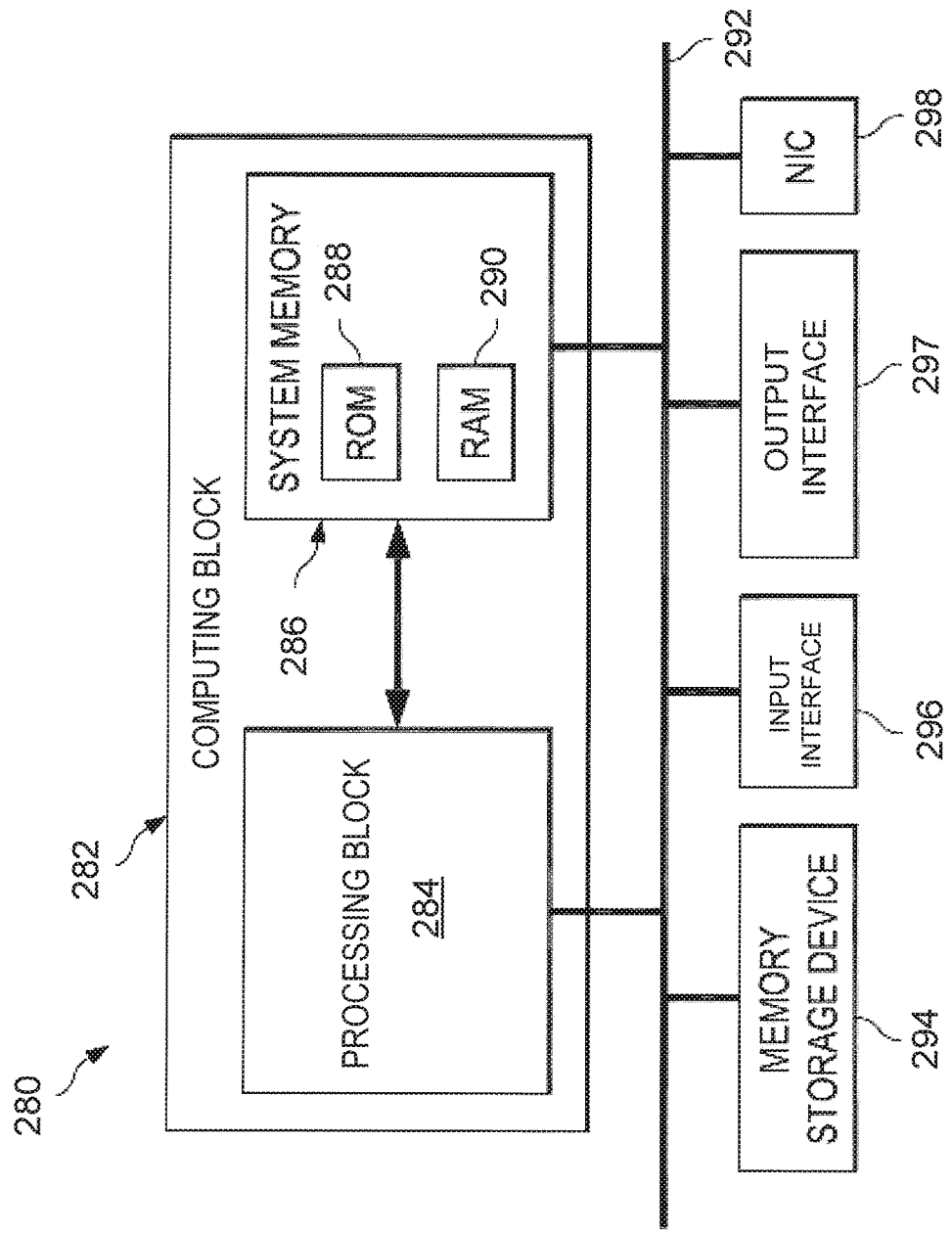

FIGS. 2A through 2C illustrate example devices that may implement the methods and teachings according to this disclosure. In particular, FIG. 2A illustrates an example UE 110, FIG. 2B illustrates an example base station 170, and FIG. 2C illustrates an example network node or network controller. These components could be used in the system 100, a SDN system, or in any other suitable system. In particular, these components could be configured for use in a source routing network as described herein.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

As shown in FIG. 2C, a device 280 (e.g., a network node or a network controller) includes a computing block 282 with a processing block 284 and a system memory 286. The processing block 284 may be any type of programmable electronic device for executing software instructions, but will conventionally be one or more microprocessors. The system memory 286 may include both a read-only memory (ROM) 288 and a random access memory (RAM) 290. As will be appreciated by those of skill in the art, both the read-only memory 288 and the random access memory 290 may store software instructions for execution by the processing block 284.

The processing block 284 and the system memory 286 are connected, either directly or indirectly, through a bus 292 or alternate communication structure, to one or more peripheral devices. For example, the processing block 284 or the system memory 286 may be directly or indirectly connected to one or more additional memory storage devices 294. The memory storage devices 294 may include, for example, a "hard" magnetic disk drive, a solid state disk drive, an optical disk drive, and a removable disk drive. The processing block 284 and the system memory 286 also may be directly or indirectly connected to input interface 296 and output interface 297. The input interface 296 may enable a connection to devices such as a keyboard, a pointing device (such as a mouse, touchpad, stylus, trackball, or joystick), a touch screen, a scanner, a camera, and a microphone. The output interface 297 may enable a connection to devices such as a display device, a printer and speakers. Such a display device may be configured to display video images.

With some implementations, the computing block 282 may also be directly or indirectly connected to one or more network interfaces cards (NIC) 298, for communicating with other devices making up a network (such as the network 300 described below). The network interface cards 298 translate data and control signals from the computing block 282 into network messages according to one or more communication protocols, such as the transmission control protocol (TCP) and the Internet protocol (IP). Also, the network interface cards 298 may employ any suitable connection agent (or combination of agents) for connecting to a wired or wireless network, including, for example, a wireless transceiver, a modem, or an Ethernet connection.

Additional details regarding the UEs 110, base stations 170, and the device 280 are known to those of skill in the art. As such, these details are omitted here. It should be appreciated that the devices illustrated in FIGS. 2A through 2C are merely examples, and are not intended to be limiting. Various embodiments of this disclosure may be implemented using one or more computing devices that include the components of the UEs 110, base stations 170, and the device 280, or which include an alternate combination of components, including components that are not shown in FIGS. 2A through 2C. For example, various embodiments of this disclosure may be implemented using a multi-processor computer, a plurality of single and/or multiprocessor computers arranged into a network, or some combination of both.

Figure 3:
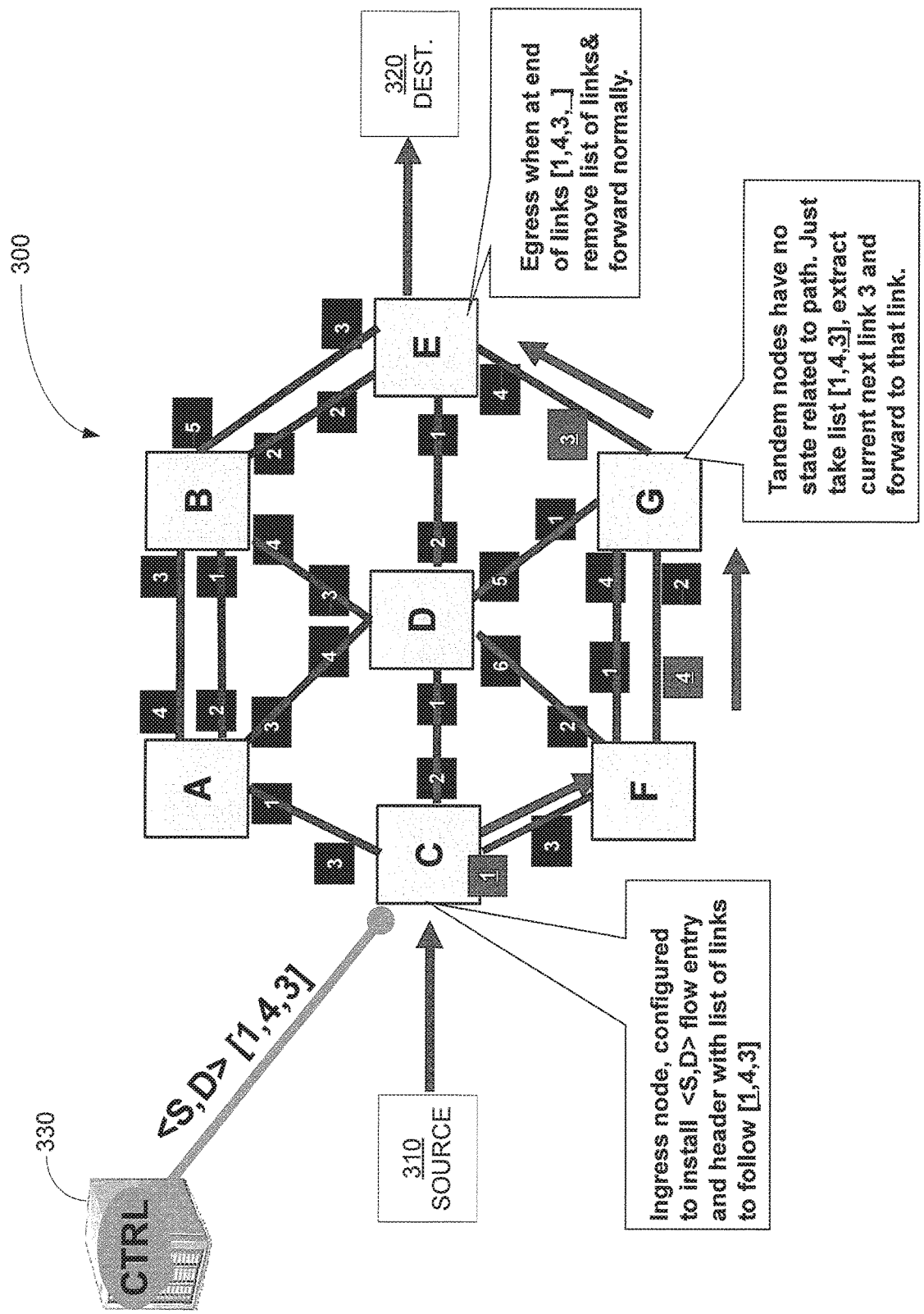
FIG. 3 illustrates an example of link source routing.

FIG. 3 illustrates an example of link source routing. As shown in FIG. 3, a plurality of nodes A-G are arranged in a network 300 between a source 310 and a destination 320. Various components in the network 300 may represent (or be represented by) one or more components described in FIGS. 1, 2A, and 2B. The source 310, destination 320, and nodes A-G can each include one or more network hardware or software components, such as a switch, a router, other hardware, or a combination of these. Each node A-G assigns a local identifier to each link between the node and an adjacent node. In some networks, this may include parallel links. For example, node A is communicatively linked to nodes C, D, and B. There are parallel links between node A and node B. Node A assigns identifiers 1 through 4 to the links with nodes C, B, D, and B, respectively.

In order to transmit packets over the network from the source 310 to the destination 320, a controller 330 (e.g., a network controller, such as a SDN controller) configures each packet with a packet header that includes the route through the network 300 that the packet is to take. In some embodiments, the controller 330 may represent (or be represented by) the device 280 of FIG. 2C. In some embodiments, the route may represent a source routed tunnel, such as a MPLS tunnel. In the example shown in FIG. 3, the route is indicated by the arrows: node C is the ingress node, node E is the egress node, and nodes F and G are tandem nodes. The ingress node, node C, configures a <S,D>flow entry and packet header that encapsulates the packet with a list of links to follow (e.g., [1,4,3]), where the links are identified by the local identifiers at each node, as known in the art. In some architectures, the list of links is formatted as a vector (e.g., [1,4,3]) that is stored in the header.

Figure 4:
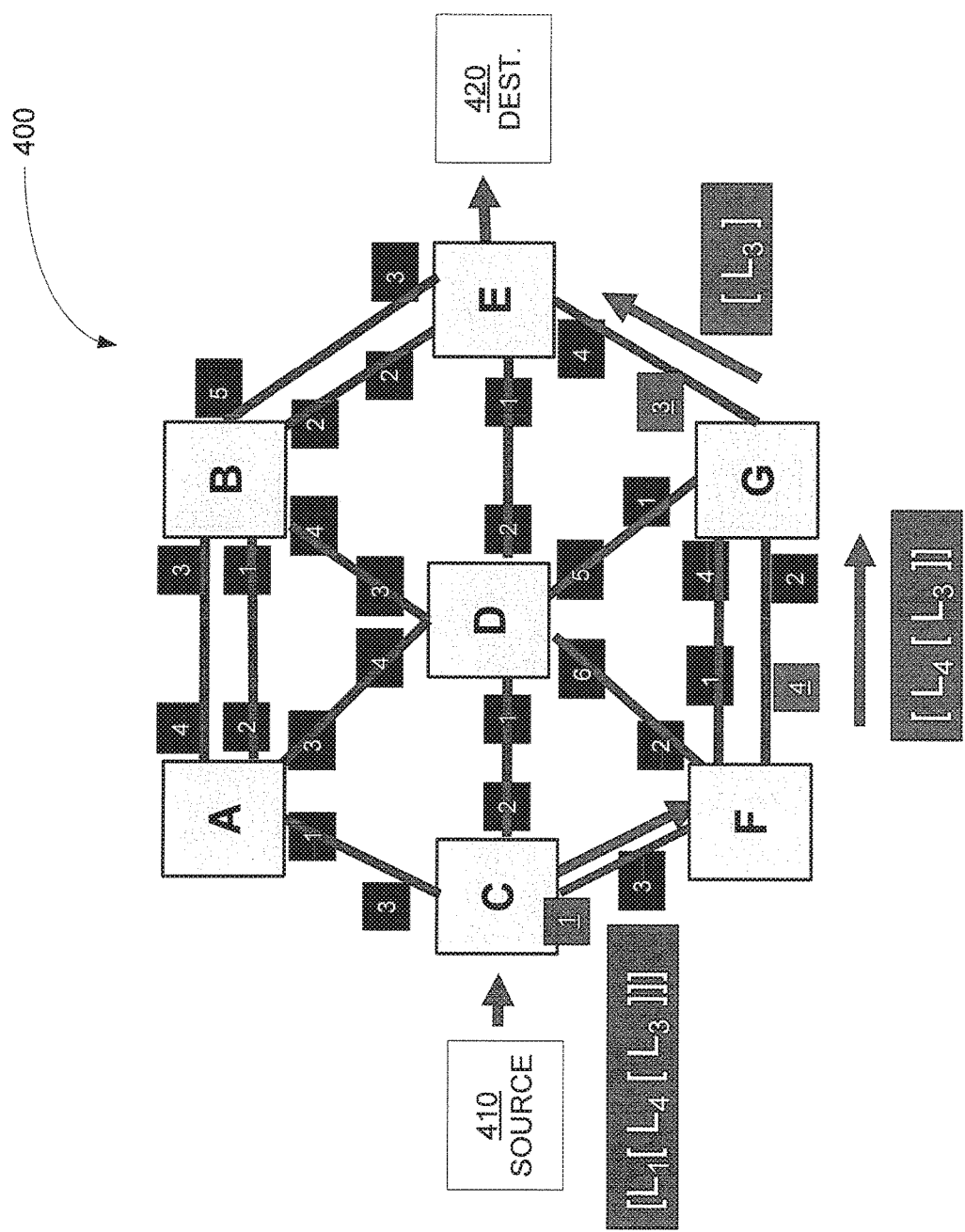
FIG. 4 illustrates an example of MPLS segment routing.

FIG. 4 illustrates an example of MPLS segment routing. Like FIG. 3, FIG. 4 shows a plurality of nodes A-G are arranged in a network 400 between a source 410 and a destination 420. Unlike the source routing example in FIG. 3, the MPLS architecture of FIG. 4 does not use a vector of link identifiers to designate a route for each packet. Instead, nodes assign local labels to each link (including parallel links, if applicable). Nodes can assign labels to sets of nodes or individual nodes for grouping. The route is then configured as a stack of labels. In the example shown in FIG. 4, the route is indicated by the arrows: node C is the ingress node, node E is the egress node, and nodes F and G are tandem or intermediate nodes. A stack of labels (e.g., [$L_1$ [$L_4$ [$L_3$]]]) indicates the route of nodes {C,F,G,E}.

Figure 5:
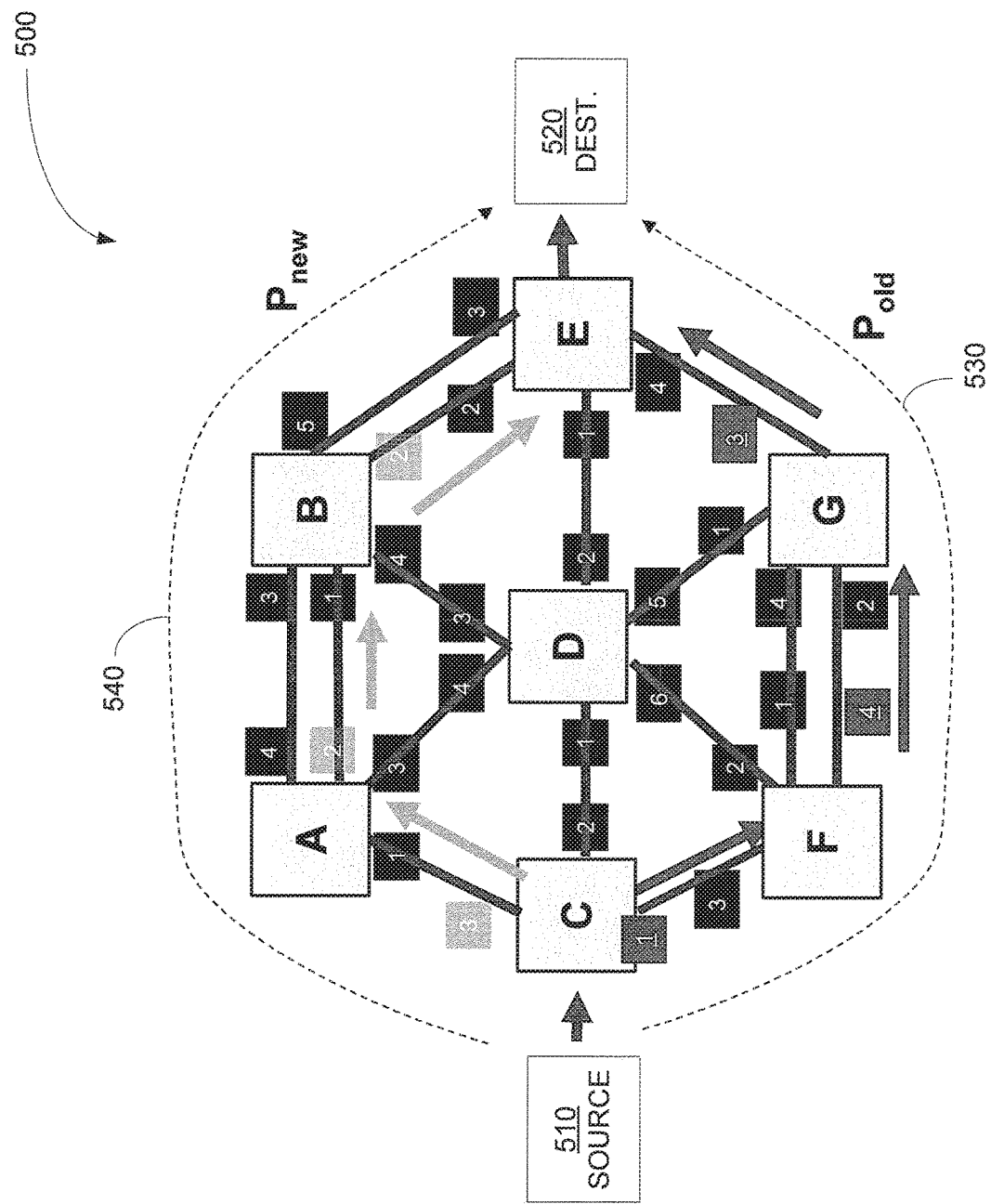
FIG. 5 illustrates an example of changing routes in a network.

FIG. 5 illustrates an example of changing routes in a network. As shown in FIG. 5, a plurality of nodes A-G are arranged in a network 500 between a source 510 and a destination 520. Various components in the network 500 may represent (or be represented by) one or more components described in FIGS. 1 through 4. Originally, packets to be transmitted from the source 510 to the destination 520 are configured to flow along the path $P_{old}$ 530 using the source route [1,4,3]. For various reasons, it may be desirable or necessary to move the flow to the path $P_{new}$ 540 using the source route [3,2,2]. In the context of global optimization, the flow may be moved to a new path in order to optimize the network performance. In other cases, the flow may be moved for maintenance reasons (e.g., movement to a new path because a network card or other hardware component in a first path may need to be replaced). In some systems, this is trivial to implement by simply changing the source route at node C from [1,4,3] to [3,2,2].

Each transmission path inherently includes a certain amount of delay due to factors such as signal propagation delays, delays in the switches, and the like. Some paths introduce more delay that other paths. For example, the delay through the path $P_{old}$ 530 (which can be represented as delay($P_{old}$)) may be different than the delay through the path $P_{new}$ 540 (which can be represented as delay($P_{new}$)).

If delay($P_{new}$)>=delay($P_{old}$), a move from the path $P_{old}$ 530 to the path $P_{new}$ 540 may result in minimal impact to the end service or QoS; for example, the end service may experience only slight jitter. On the other hand, if delay($P_{new}$)<delay($P_{old}$), and the packet transmission path is moved from the path $P_{old}$ 530 to the path $P_{new}$ 540, there is a possibility of packets arriving out of order at the destination 520.

To resolve this issue, the embodiments described herein provide an additional delay dt that can be introduced on the path $P_{new}$ to ensure that delay($P_{new}$)>=delay($P_{old}$).

Figure 6A:
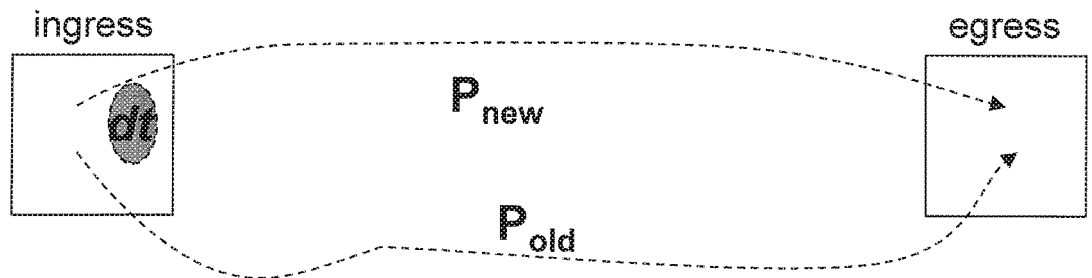
FIGS. 6A through 6C illustrate example methods for introducing an additional delay in a source routing path to minimize packets out of order, according to this disclosure.
Figure 6B:
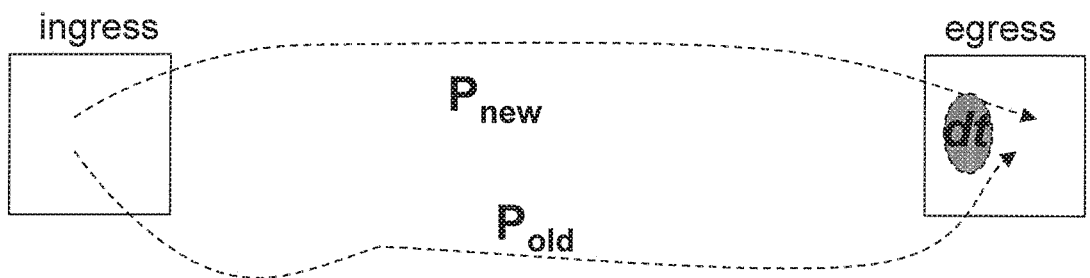
Figure 6C:
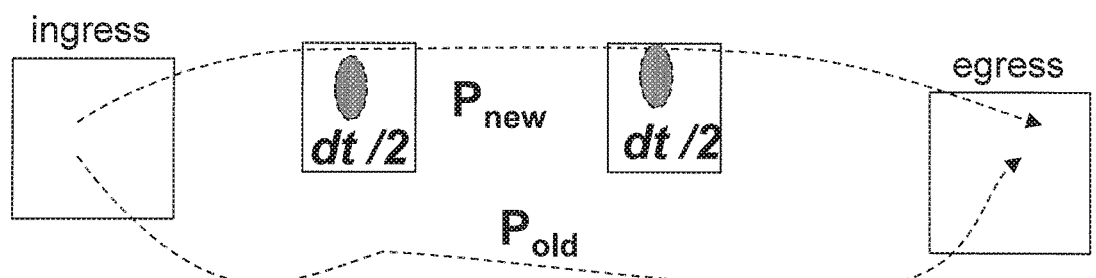

FIGS. 6A through 6C illustrate example methods for introducing an additional delay in a source routing path to minimize packets out of order, according to this disclosure. For ease of explanation, these methods may be described as being used in connection with one or more components in FIGS. 1 through 5. Of course, these methods may be used in any other suitable device or system.

The additional delay dt can be introduced on the path $P_{new}$ to ensure that delay($P_{new}$)>=delay($P_{old}$). In some embodiments, the delay dt can be calculated using the following formula:

$$dt = \text{delay}(P_{old}) - \text{delay}(P_{new}). \qquad (1)$$

In the absence of network congestion, the calculation of delay($P_{old}$), delay($P_{new}$), and dt is fairly deterministic. Most contributors to path delay (e.g., signal propagation delays, delays in the switches, etc.) can be estimated in advance to a suitable degree of accuracy. In some systems, the delays can even be determined empirically, e.g., by sending pings down different paths. If dt<0, then delay($P_{new}$)>delay($P_{old}$), and there is minimal impact to end service. Alternatively, if dt>0, then an additional delay greater than or equal to dt is introduced into the new path $P_{new}$. In FIGS. 6A-6C, delay ($P_{new}$)<delay($P_{old}$), as represented by the lengths of the respective dashed lines. Thus, dt>0. Of course, the dashed lines should not be inferred to suggest a particular physical path or path length. Rather, the lengths of the dashed lines merely represent a temporal length of delay.

As shown in FIG. 6A, in some embodiments, the delay dt is introduced at the ingress (e.g., at node C or at the source 510 in FIG. 5) using one or more buffering techniques as known in the art. Thus, in FIG. 6A, each packet is temporarily stored in a buffer memory at the ingress for a period of time dt before being transmitted along the path $P_{new}$. The delay ensures that packets sent along the path $P_{new}$ arrive at the destination after previous packets sent along the path $P_{old}$.

At shown in FIG. 6B, in some embodiments, the delay dt is introduced at the egress (e.g., at node E or at the destination 520 in FIG. 5). Thus, in FIG. 6B, each packet is transmitted along the path $P_{new}$ and then buffered at the egress for a period of time dt before being released at the destination.

In some systems, adding all of the delay dt at the ingress or egress can be expensive in terms of buffer use. A tandem method to spread the delay buffer space along the path is therefore useful. As shown in FIG. 6C, in some embodiments, the delay dt is divided into multiple parts and the parts are distributed among different points or nodes along the path $P_{new}$. For example, in FIG. 6C, the delay dt is divided into two substantially equal parts, each having a delay of dt/2. The two delays are implemented at different intermediate nodes along the path $P_{new}$ (e.g., at nodes A and B in FIG. 5). That is, each of the intermediate nodes imparts a delay of dt/2 on each packet before continuing to forward the packet according to the remainder of the route.

Different methods may be used to divide the delay dt into multiple parts. In some embodiments, the delay dt may be divided equally, such that each part represents a substantially equal delay. In some embodiments, the number of parts may be equal to the number of tandem nodes in the path (e.g., two tandem nodes A and B in FIG. 5). In some embodiments, one or more tandem nodes may be excluded from delay buffering (e.g., due to lack of buffer memory), in which case the delay dt is divided equally over the remaining (non-excluded) tandem nodes.

In other embodiments, the delay may be divided unequally. For example, the delay dt may be divided into dt/3 and 2dt/3, where node A introduces the delay dt/3 and node B introduces the delay 2dt/3. As stated above, in determining a suitable delay at each node, one consideration might be how much buffer memory each node has. Another consideration may be the amount of overall traffic at each node. Nodes with more memory or less traffic may more suitable for absorbing a delay than nodes with comparatively less memory or greater traffic.

In still other embodiments, combinations of FIGS. 6A, 6B, and 6C may be used. For example, the overall delay dt may be distributed among the ingress and one or more tandem nodes. Or the overall delay dt may be distributed among the egress and one or more tandem nodes. Or the overall delay dt may be distributed among the ingress, the egress, and one or more tandem nodes. In all cases, the distribution may include equal delays or unequal delays at different nodes, depending on the network requirements.

FIGS. 7A and 7B illustrate example methods for using logical variable delay segments to achieve an additional delay in a source routing path, according to this disclosure. For ease of explanation, these methods may be described as being used in connection with one or more components in FIGS. 1 through 6C. Of course, these methods may be used in any other suitable device or system.

As shown in FIG. 7A, a network 700 includes an ingress 710 and an egress 720. At least two routes, $P_{old}$ and $P_{new}$, are provided between the ingress 710 and the egress 720. The route $P_{new}$ includes a number of tandem nodes or traversing nodes, including nodes 730 and 740. In some embodiments, the network 700 is a MPLS network. In MPLS networks, a route is divided into multiple segments. Based on the segment identifiers (#6, #8, and #2) shown in FIG. 7A along the route $P_{new}$, the list of segments for the route $P_{new}$ would include [#6, . . . , #8, #2, . . . ]. This segment list can be embedded in the packet header.

To introduce a delay at the nodes 730 and 740, one or more logical segments or identifiers can be included in the source route. For example, the head end (e.g., a network controller, such as the controller 330 in FIG. 3) can add one or more delay-inducing logical segment identifiers to the segment list in the packet header that encapsulates the packet. For example, as shown in FIG. 7B, a logical segment #1004 could be added at one or more nodes. The logical segment #1004 does not change the physical path of the packet route, because the logical segment does not represent a physical hop. Instead each logical segment merely adds a delay at the node associated with the logical segment. That is, the logical segment is a logical hop within a single node that causes a delay to occur at the node. For example, in FIG. 7B, logical segments #1004 have been added at the nodes 730 and 740 in the route $P_{new}$. Accordingly, the new segment list for FIG. 7B is [#6, . . . , #1004, #8, #1004, #2,], where each #1004 represents a logical segment at the nodes 730 and 740. Each logical segment #1004 does not actually change the path of the packet route, because the logical segment logically loops back to the node associated with the logical segment. However, each logical segment #1004 introduces a delay at the node.

In some embodiments, the logical segment identifier value (#1004) directly controls the delay amount. A tandem node along the route interprets the special identifiers as triggers for fixed amounts of delay and imparts that amount of delay on the packet before continuing the forwarding according to the remainder of the source route. That is, upon determining the logical segment identifier in the segment list, the tandem node knows to delay the packet by a predetermined amount of time represented by the identifier value. For example, logical segment identifier #1004 may represent a delay of, e.g., 2 microseconds or 3 microseconds.

In some embodiments, a network could have separate, predetermined identifiers for short, medium, or long delays. For example, #1004, #1005, and #1006 could correspond to delays of 1 microsecond, 5 microseconds, and 10 microseconds, respectively. In some embodiments, a range of identifiers could correspond to a range of delays: #1101, #1102, . . . , #1110 could correspond to delays of 1, 2, . . . , 10 microseconds, respectively. In some embodiments, multiple logical segments could be stacked consecutively to achieve longer delays. For example, a segment list could include consecutive entries for #1004 and #1006 to achieve a 1 μsec+10 μsec=11 μsec delay. Of course, #1004, #1005, #1101, etc., are merely example identifiers, and 1 μsec, 5 μsec, 10 μsec, etc., are merely example delay durations. Other logical segment identifiers and delay values are possible.

As shown in FIG. 7B, the total delay may be broken up into multiple sub-delays, each represented by a segment identifier and imparted by a single or several different nodes in the network. For example, in FIG. 7B, both of the nodes 730-740 include a delay represented by the logical segment identifier #1004. The total of the sub-delays adds up to the intended additional end to end delay required to avoid reordering during a move from a higher delay path to a lower delay path.

Figure 8:
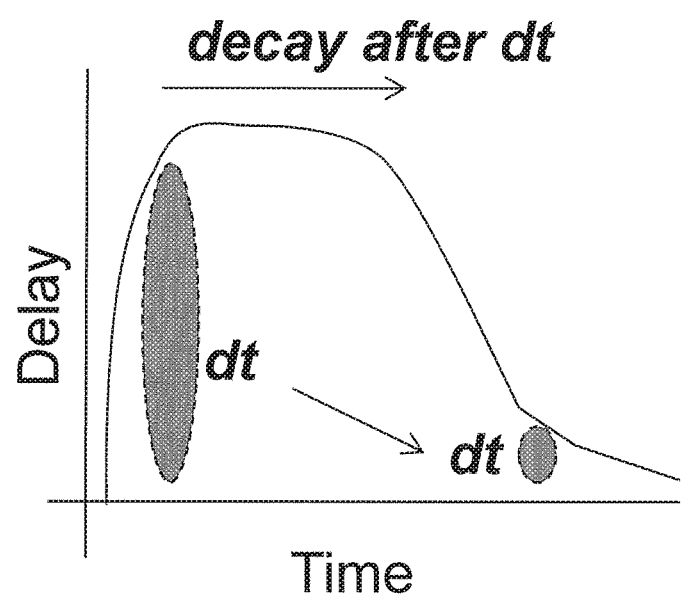
FIG. 8 illustrates example methods for removing additional delay over time in a source routing path, according to this disclosure.

FIG. 8 illustrates example methods for removing additional delay over time in a source routing path, according to this disclosure. For ease of explanation, these methods may be described as being used in connection with one or more components in FIGS. 1 through 7B. Of course, these methods may be used in any other suitable device or system.

Generally speaking, once the additional delay dt has been introduced into the path $P_{new}$, it may not be necessary to maintain the delay indefinitely for all future packets transmitted along the path $P_{new}$. That is, once all traffic through the path $P_{old}$ has been successfully transmitted to the egress point, there is no need to maintain the delay dt along the path $P_{new}$. At that point, the delay dt simply consumes resources and increases latency on the segment. Thus, the delay dt can be removed after a period of time has elapsed. In some embodiments, the delay dt can be removed quickly, such as setting the delay dt to zero on the next transmitted packet. In other embodiments, the delay dt can be slowly removed, or "decayed" over time (e.g., over a period of one or two hours).

In some embodiments, after the delay dt is introduced to the path $P_{new}$ using one or more of the techniques described in FIGS. 6A-6C, the decay can begin after one full delay cycle (dt), as shown in FIG. 8. The delay is reduced to zero over a finite period of time using a suitable decay method. Example decay techniques include logarithmic decay, geometric decay, linear decay, and the like. If the overall delay dt is distributed among multiple nodes, as in FIG. 6C, the decay can occur simultaneously at the multiple nodes, or in succession, such that one node's delay decays to zero before another node's delay starts to decay. Instructions for reducing the delay can provide each node with explicit packetby-packet delay constraints or can provide nodes with parameters or a formula to govern the decay in the delay.

Figure 9:
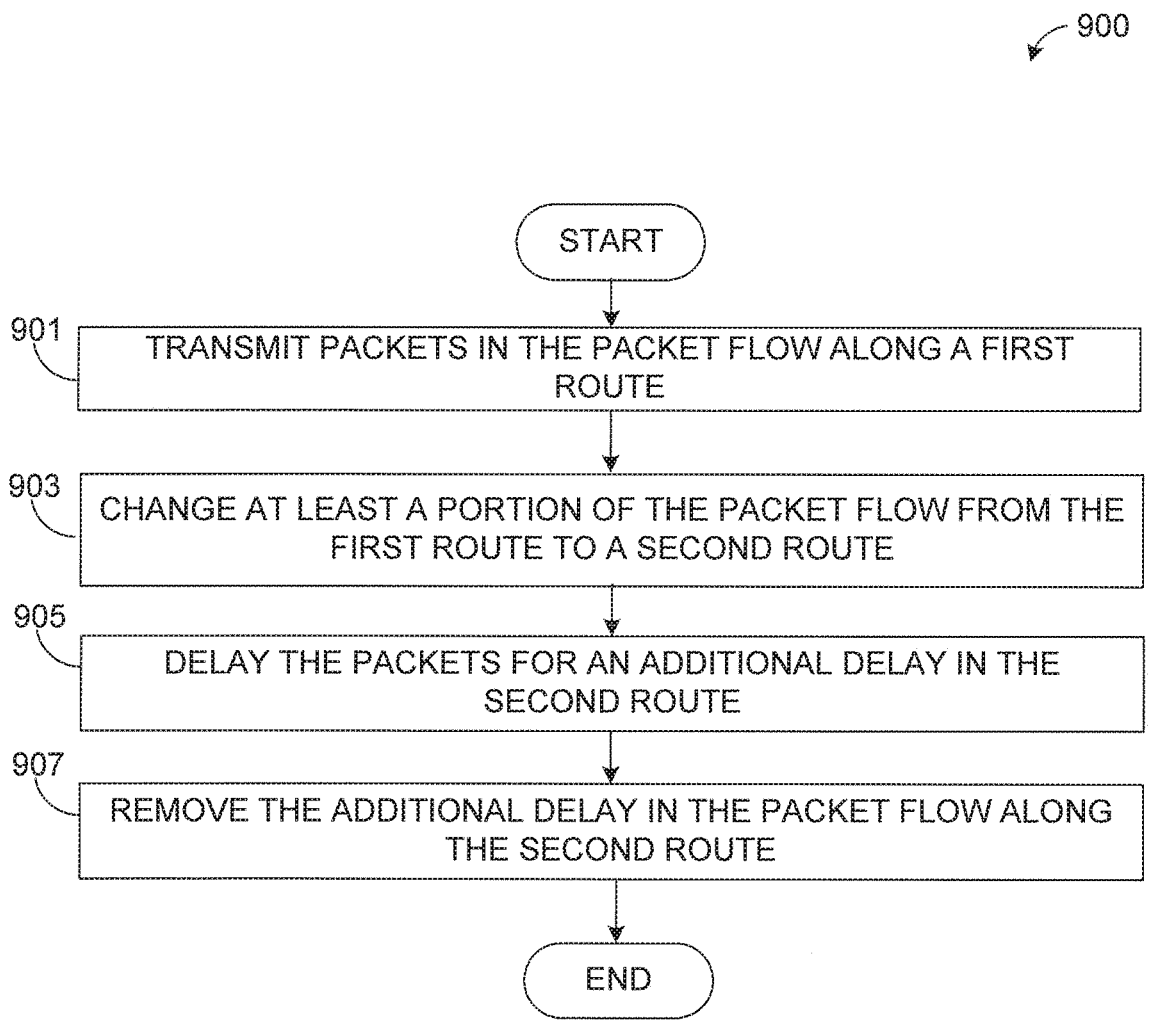
FIG. 9 illustrates an example method for directing packets in a packet flow from a source to a destination, according to this disclosure.

FIG. 9 illustrates an example method for directing packets in a packet flow from a source to a destination, according to this disclosure. For ease of explanation, the method 900 is described as being used in connection with one or more components in FIGS. 1 through 8. However, the method 900 could be used by any suitable device or in any suitable system or network.

At step 901, a plurality of packets in a packet flow are transmitted along a first route from the source to the destination, where the first route includes a first delay. For example, this may include packets transmitted along the route {C, F, G, E} in FIGS. 3 through 5. In some embodiments, only a first packet in the flow is transmitted along the first route.

At step 903, at least a portion of the packet flow is changed from the first route to a second route different from the first route. That is, after a first packet is transmitted along the first route, a second packet (and, in some embodiments, one or more subsequent packets) is transmitted along a second route. For example, this may include changing the packet flow to the route {C, A, B, E} in FIGS. 3 through 5. The second route includes a second delay that has a duration less than the duration of the first delay.

At step 905, prior to each packet along the second route arriving at the destination, the packet is delayed for an additional delay, where the additional delay is greater than or equal to a difference between the first delay and the second delay. This may include incorporating an additional delay as shown in FIGS. 6A through 6C. In some embodiments, the additional delay occurs at an egress point or an ingress point along the second route. In some embodiments, the additional delay is distributed among multiple intermediate nodes in the second route, and each of the multiple intermediate nodes imparts a portion of the additional delay on each packet before continuing to forward the packet according to a remainder of the route. The multiple intermediate nodes can include all, or only a portion, of the total number of intermediate nodes in the second route.

Later, at step 907, after all packets transmitted along the first route have been successfully transmitted to the destination, the additional delay in the packet flow along the second route is removed. This may include decaying the additional delay over a period of time, as shown in FIG. 8. Reducing the delay (also referred to as decaying) can be achieved by reducing the delay at different nodes at the same time, reducing the delay one node at a time, and combinations thereof. It is also possible to reduce the delay at one node while increasing it at another node, which may be done for operational reasons.

Figure 10:
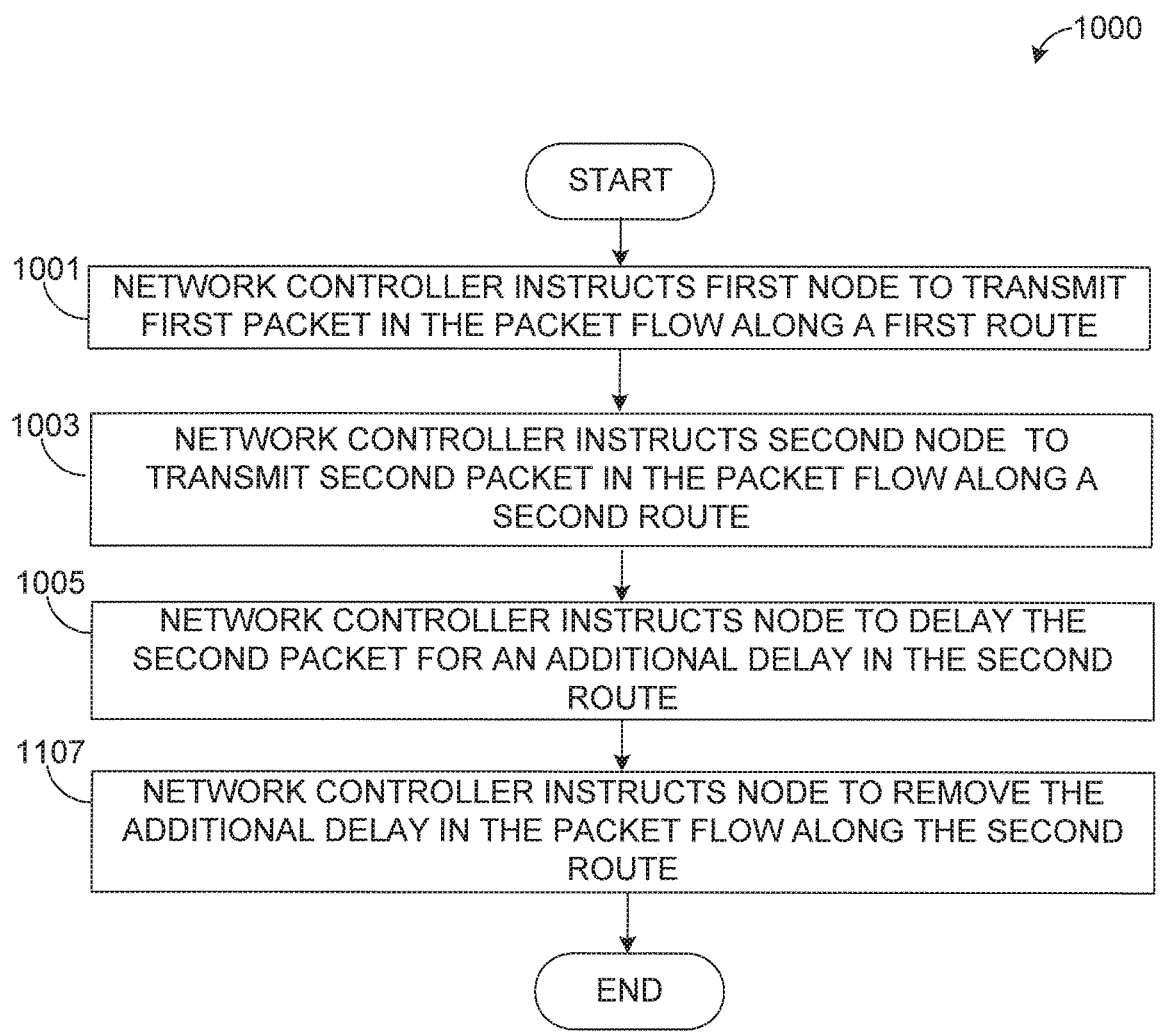
FIG. 10 illustrates an example method for a network controller to direct packets in a packet flow from a source to a destination, according to this disclosure.

FIG. 10 illustrates an example method for a network controller to direct packets in a packet flow from a source to a destination, according to this disclosure. For ease of explanation, the method 1000 is described as being used in connection with one or more components in FIGS. 1 through 8. In particular, the method 1000 may be performed by a controller such as the network controller 330 or the device 280. However, the method 1000 could be used by any suitable device or in any suitable system or network.

At step 1001, the network controller transmits instructions to a first node in a network segment to transmit a first packet in the packet flow along a first route from the source to the destination, where the first route has a first delay. For example, this may include the network controller 330 sending instructions to the nodes C, F, G, and E to transmit a first packet along the route {C, F, G, E} in FIGS. 3 through 5. The network controller 330 may indicate the first route to the nodes C, F, G, and E by transmitting route information directly to each node, or by including route information in a packet header for the first packet. The packet header may include route information for only the first packet, or may including route information for subsequent packets in the packet flow as well.

At step 1003, the network controller transmits instructions to a second node in the network segment to transmit a second packet in the packet flow along a second route different from the first route. The second node may be the same as or different from the first node. For example, this may include the network controller 330 controlling the nodes C, A, B, and E to transmit the second packet along the route {C, A, B, E} in FIGS. 3 through 5. The second route has a second delay that has a duration less than the duration of the first delay. The network controller 330 may indicate the second route to the nodes C, A, B, and E by transmitting route information directly to each node, or by including route information in a packet header for the second packet.

At step 1005, the network controller transmits instructions to a node in the second route to delay the second packet for an additional delay prior to the second packet arriving at the destination, where the additional delay is provided in order to delay arrival of the second packet at the destination. This may include the network controller 330 controlling one or more of the nodes C, A, B, and E to incorporate an additional delay as shown in FIGS. 6A through 6C. The network controller 330 may transmit information about the additional delay directly to the nodes C, A, B, or E, or may incorporate the delay information in the packet header. In some embodiments, the additional delay occurs at an egress point or an ingress point along the second route. In some embodiments, the additional delay is distributed among multiple nodes in the second route, and each of the multiple nodes imparts a portion of the additional delay on each packet before continuing to forward the packet according to a remainder of the route. The multiple nodes can include all, or only a portion, of the total number of nodes in the second route.

Later, at step 1007, after all packets transmitted along the first route have been successfully transmitted to the destination, the network controller instructs the node to remove the additional delay in the packet flow along the second route. This may include decaying the additional delay over a period of time, as shown in FIG. 8.

Figure 11:
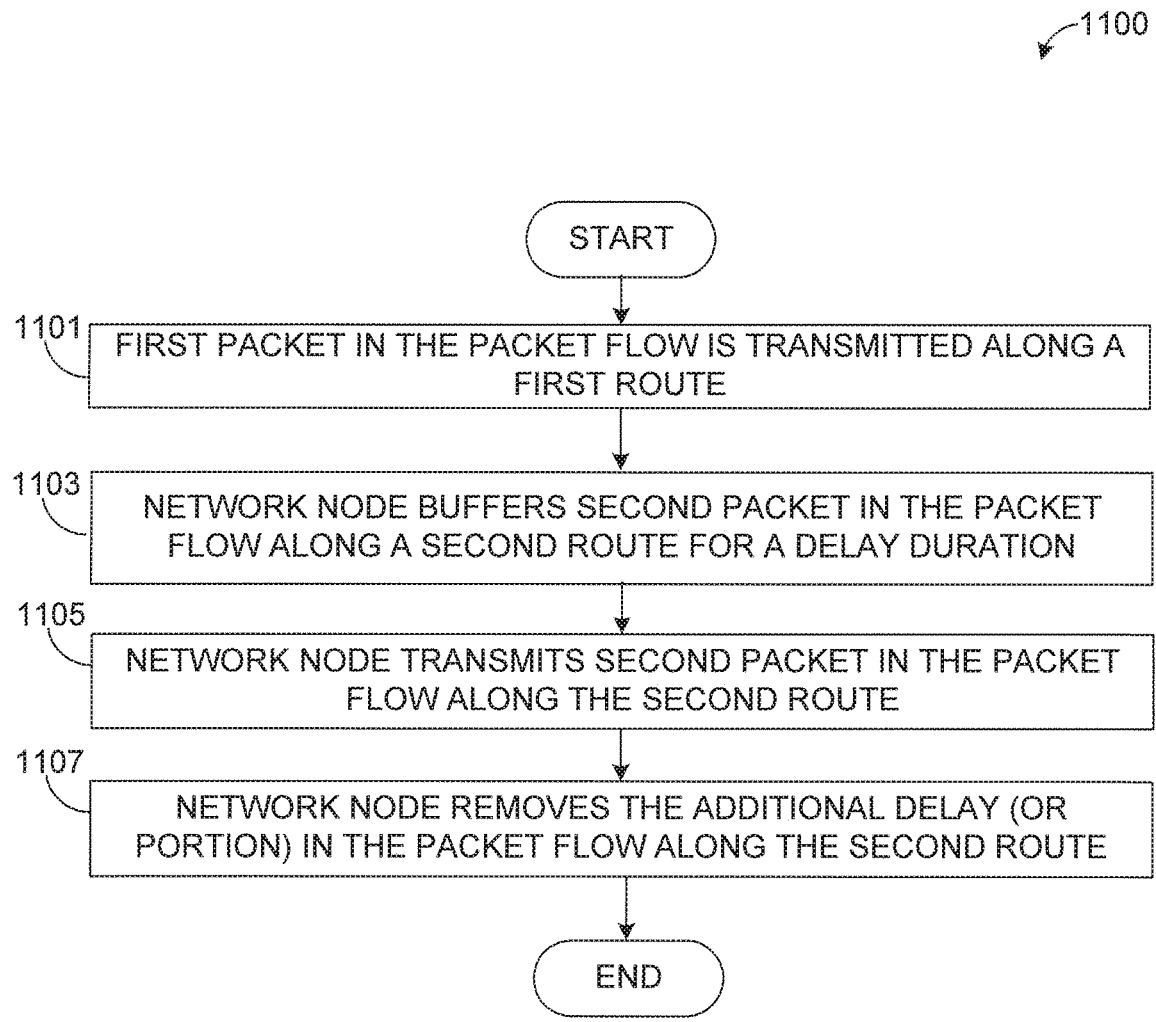
FIG. 11 illustrates an example method for a network node to direct packets in a packet flow from a source to a destination, according to this disclosure.

FIG. 11 illustrates an example method for a network node to direct packets in a packet flow from a source to a destination, according to this disclosure. For ease of explanation, the method 1100 is described as being used in connection with one or more components in FIGS. 1 through 8. In particular, the method 1100 may be performed by a network node such as one of the network nodes A through G in FIGS. 3 through 6, or by the device 280 in FIG. 2C. However, the method 1100 could be used by any suitable device or in any suitable system or network.

At step 1101, a first packet in a packet flow is transmitted along a first route from the source to the destination, where the first route includes a first delay. For example, this may include the network node C transmitting a first packet to the network node F as the first packet moves along the route {C, F, G, E} in FIGS. 3 through 5. The first packet is transmitted along the first route based on instructions received from a network controller, such as the network controller 330. It will be understood that tandem nodes that are part of the second route, and not part of the first route, will not need to perform step 1101.

At step 1103, the network node receives a second packet in a packet flow and, prior to transmitting the second packet along a second route from the source to the destination, the network node buffers the second packet for a delay duration. The delay duration is determined in accordance with a difference between the first delay and a second delay associated with the second route. For example, if the illustrative node is node C, it incorporates a delay as shown in FIG. 6A, and other nodes such as node E may introduce an additional delay as shown in FIG. 6B. In some embodiments, the additional delay occurs at an egress point or an ingress point along the second route. In some embodiments, the additional delay is distributed among multiple nodes in the second route, and each of the multiple nodes imparts a portion of the additional delay on each packet before continuing to forward the packet according to a remainder of the route. The multiple nodes can include all, or only a portion, of the total number of nodes in the second route.

At step 1105, after buffering the packet, the network node transmits the second packet along the second route, which is different from the first route. For example, this may include the network node C transmitting a second packet to the network node A as the second packet moves along the route {C, A, B, E} in FIGS. 3 through 5. The network node transmits the second packet along the second route based on instructions the network node receives from the network controller.

Later, at step 1107, after all packets transmitted along the first route have been successfully transmitted to the destination, the network node removes the delay that is introduced (or a portion thereof) in the packet flow along the second route. This may include decaying the additional delay over a period of time, as discussed with relation to FIG. 8 and described above.

Although FIGS. 9 through 11 illustrate example methods for directing packets in a packet flow from a source to a destination, various changes may be made to these figures. For example, while shown as a series of steps, various steps in FIGS. 9 through 11 could overlap, occur in parallel, occur in a different order, or occur any number of times.

As described herein, in some packed-based networks, when moving traffic from one route to another in the network, there is a possibility of packets arriving out of order when the new route exhibits a shorter delay than the previous path. Because of this, it can be difficult to implement global optimization processes to optimize flows in the network in a manner that is transparent to the end devices.

To address and mitigate these issues, the embodiments disclosed above promote "hitless" movement of flows (i.e., movement without reordering of packets) from path to path in a network. The embodiments allow global optimization processes to focus on the mathematically optimum solutions, rather than suboptimal solutions due to a need not to impact some services by moving them. The disclosed embodiments allow for the distribution of delay buffers along the path and control of the amount of delay used at each hop without explicit signaling.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for a network node to direct packets in a packet flow from a source to a destination in a network, the method comprising:
   buffering, by the network node, a packet in the packet flow for a delay duration in accordance with a first instruction from a network controller, prior to transmitting the packet along a second route from the source to the destination, the delay duration determined in accordance with a difference between a second delay associated with the second route and a first delay associated with a first route between the source and the destination, wherein the network node is a tandem node between an ingress node connected to the source and an egress node connected to the destination; and
   delaying, by the network node, transmission of the packet along the second route between the source and the destination in accordance with the delay duration.

2. The method of claim 1, wherein the first route and the second route are identified in part by a source routing packet header or a Multiprotocol Label Switching (MPLS) segment routing packet header that encapsulates each packet.

3. The method of claim 1, further comprising:
   reducing the delay duration for a subsequent packet in the packet flow in response to receipt of a second instruction to reduce the delay duration from the network controller.

4. The method of claim 3, wherein the second instruction to reduce the delay duration is included in the first instruction to buffer the packet.

5. The method of claim 3, wherein the second instruction to reduce the delay duration includes the second instruction to reduce the delay duration in accordance with a decay function, the decay function being one of a logarithmic decay function, a geometric decay function, or a linear decay function over a finite period of time.

6. The method of claim 1, further comprising:
   prior to buffering the packet in the packet flow for the delay duration, transmitting a first packet along the first route between the source and the destination.

7. The method of claim 6, wherein the delaying reduces a likelihood that the first packet and the packet will arrive at the destination in a wrong order.

8. The method of claim 1, wherein a sum of the delay duration and the second delay is larger than or equal to the first delay.

9. The method of claim 1, the delaying comprising delaying, by the network node, transmission of the packet along the second route by a fraction of the delay duration, the fraction being less than 1.

10. A network node configured to direct packets in a packet flow from a source to a destination in a network, the network node comprising:
   at least one memory; and
   at least one processor coupled to the at least one memory, the at least one processor configured to control the network node to:
      buffer a packet in the packet flow for a delay duration in accordance with a first instruction from a network controller, prior to transmitting the packet along a second route from the source to the destination, the delay duration determined in accordance with a difference between a second delay associated with the second route and a first delay associated with a first route between the source and the destination, wherein the network node is a tandem between an ingress node connected to the source and an egress node connected to the destination; and
      delay transmission of the packet along the second route between the source and the destination in accordance with the delay duration.

11. The network node of claim 10, wherein the first route and the second route are identified in part by a source routing packet header or a Multiprotocol Label Switching (MPLS) segment routing packet header that encapsulates each packet.

12. The network node of claim 10, wherein the at least one processor is further configured to control the network node to:
   reduce the delay duration for a subsequent packet in the packet flow in response to receipt of a second instruction to reduce the delay duration from the network controller.

13. The network node of claim 12, wherein the second instruction to reduce the delay duration is included in the first instruction to buffer the packet.

14. The network node of claim 12, wherein the second instruction to reduce the delay duration includes the second instruction to reduce the delay duration in accordance with a decay function, the decay function being one of a logarithmic decay function, a geometric decay function, or a linear decay function over a finite period of time.

15. The network node of claim 10, wherein the at least one processor is further configured to control the network node to:
   prior to buffering the packet in the packet flow for the delay duration, transmit a first packet along the first route between the source and the destination.

16. A network node configured to direct packets in a packet flow from a source to a destination in a network, the network node comprising:
   a receiver configured to receive a first instruction from a network controller; and
   a buffer memory configured to:
      buffer a packet in the packet flow for a delay duration in accordance with the received first instruction, prior to transmitting the packet along a second route from the source to the destination, the delay duration determined in accordance with a difference between a second delay associated with the second route and a first delay associated with a first route between the source and the destination, wherein the network node is a tandem node between an ingress node connected to the source and an egress node connected to the destination; and
      delay transmission of the packet along the second route between the source and the destination in accordance with the delay duration.

17. The network node of claim 16, wherein the first route and the second route are identified in part by a source routing packet header or a Multiprotocol Label Switching (MPLS) segment routing packet header that encapsulates each packet.

18. The network node of claim 16, wherein the network node further comprises at least one processor, the at least one processor configured to control the network node to:
   reduce the delay duration for a subsequent packet in the packet flow in response to receipt of a second instruction to reduce the delay duration from the network controller.

19. The network node of claim 18, wherein the second instruction to reduce the delay duration is included in the first instruction to buffer the packet.

20. The network node of claim 18, wherein the second instruction to reduce the delay duration includes the second instruction to reduce the delay duration in accordance with a decay function, the decay function being one of a logarithmic decay function, a geometric decay function, or a linear decay function over a finite period of time.

* * * * *